United States Patent [19]

Freeman

[11] Patent Number: 4,474,020

[45] Date of Patent: Oct. 2, 1984

[54] PRESSURE AIR COOLING CHAMBER FOR UNITIZED VEGETABLE LOADS

[75] Inventor: Carl D. Freeman, Salinas, Calif.

[73] Assignee: Bud Antle, Inc., Salinas, Calif.

[21] Appl. No.: 473,884

[22] Filed: Mar. 10, 1983

[51] Int. Cl.³ ............................................. F25D 17/06
[52] U.S. Cl. .......................................... 62/89; 62/237; 62/265; 62/413; 62/417; 62/419; 312/296
[58] Field of Search ................. 62/265, 237, 413, 417, 62/419, 89; 312/296

[56] References Cited

U.S. PATENT DOCUMENTS

| | | | |
|---|---|---|---|
| 2,293,316 | 8/1942 | Stebbins | 62/237 |
| 3,215,059 | 11/1965 | Haas | 62/237 |
| 3,545,223 | 12/1970 | Elland | 62/237 |
| 3,621,672 | 11/1971 | Meredith | 62/265 |

*Primary Examiner*—Ronald C. Capossela

[57] ABSTRACT

A cooling chamber for drawing down freshly picked and field warmed unitized (for example in cartons stacked on pallets) vegetables, such as cauliflower, is disclosed. Freshly picked cauliflower is placed in rectangular cartons in side-by-side stacks of four extending approximately fourteen cartons high. A group of individual pallets (typically 10 to 12) so loaded are typically placed in the field on a transport chassis and brought to the vicinity of the cooling chamber where they are simultaneously unloaded by a multi-pallet forklift truck. The chamber receives multi-pallet load through an open door and is inserted into the chamber. This chamber has a rear seal which conforms to the periphery of the load and defines in the interstitial volume between the chamber backwall and load a warm air return plenum to forced draft refrigeration apparatus. The load when placed within the chamber has a door closed to form an air-tight seal. At the same time, this door forms an interstitial volume between the load and door for a high pressure cool air plenum from the forced draft refrigeration apparatus. Circulation of forced and cooled air occurs for rapid draw-down of the palletized vegetable load to a curing temperature. Thereafter, and upon cooling of the load, opening of the door followed by removal of the load occurs. There results an apparatus and process for rapid vegetable cool-down in an isolated and portable chamber.

9 Claims, 6 Drawing Figures

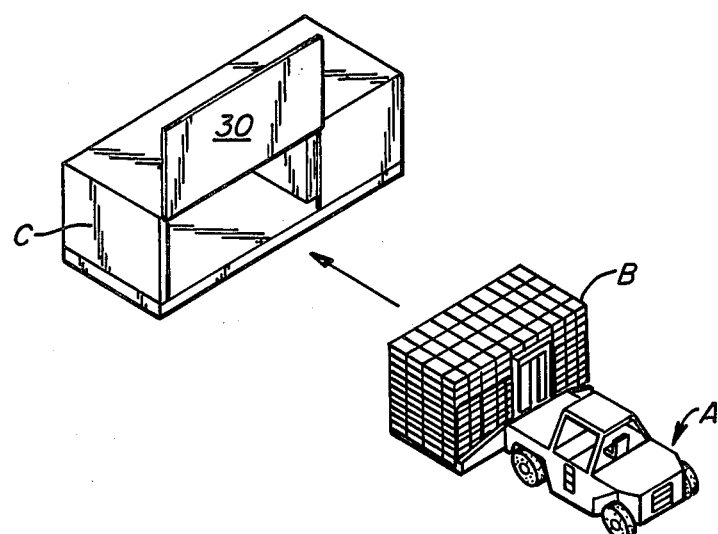
FIG._1A.
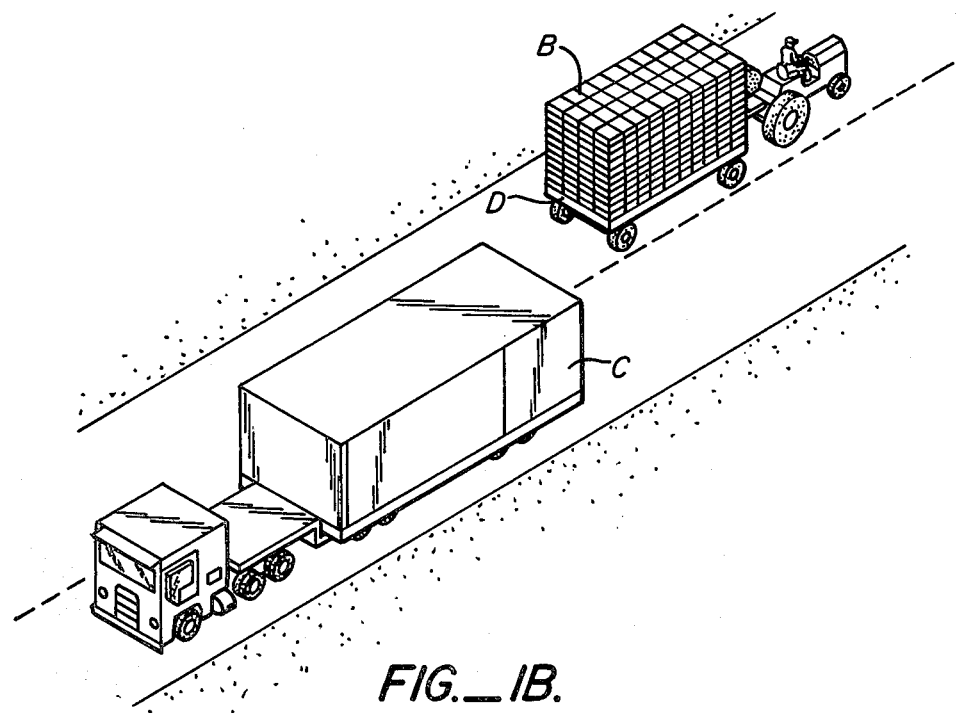
FIG._1B.

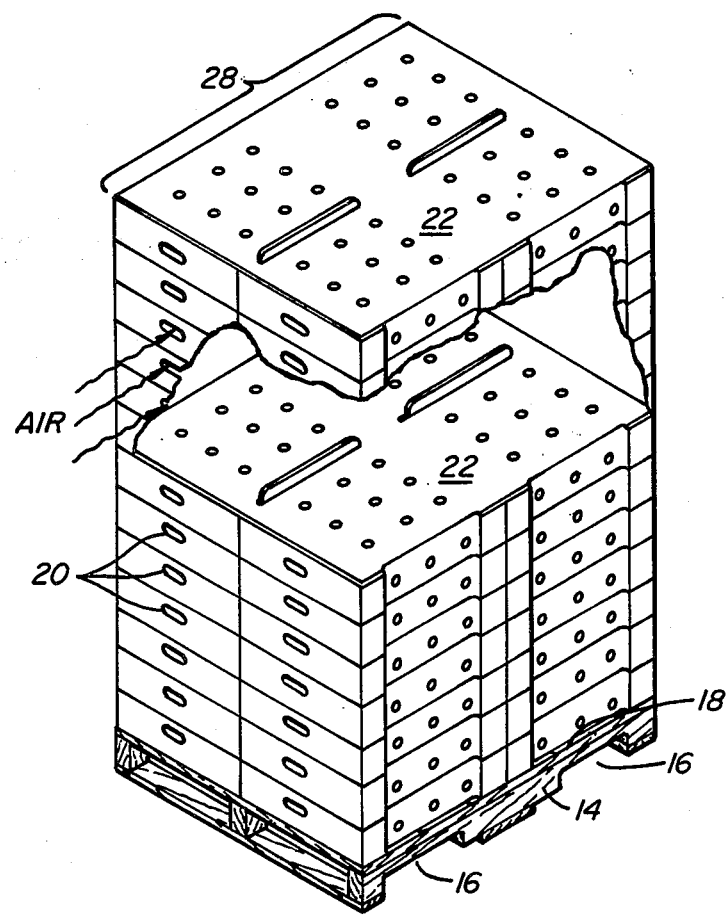
FIG._2.
PRIOR ART

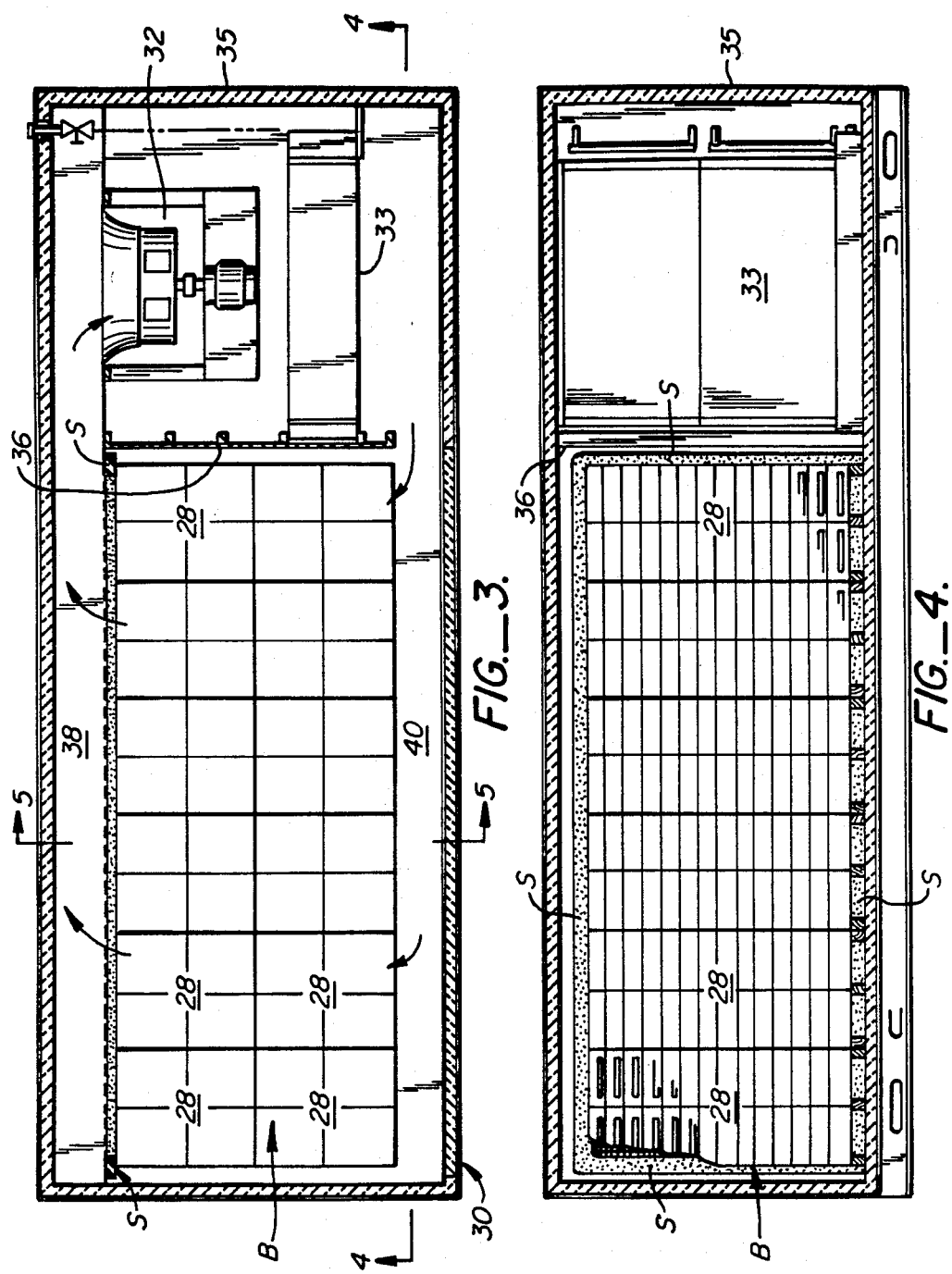

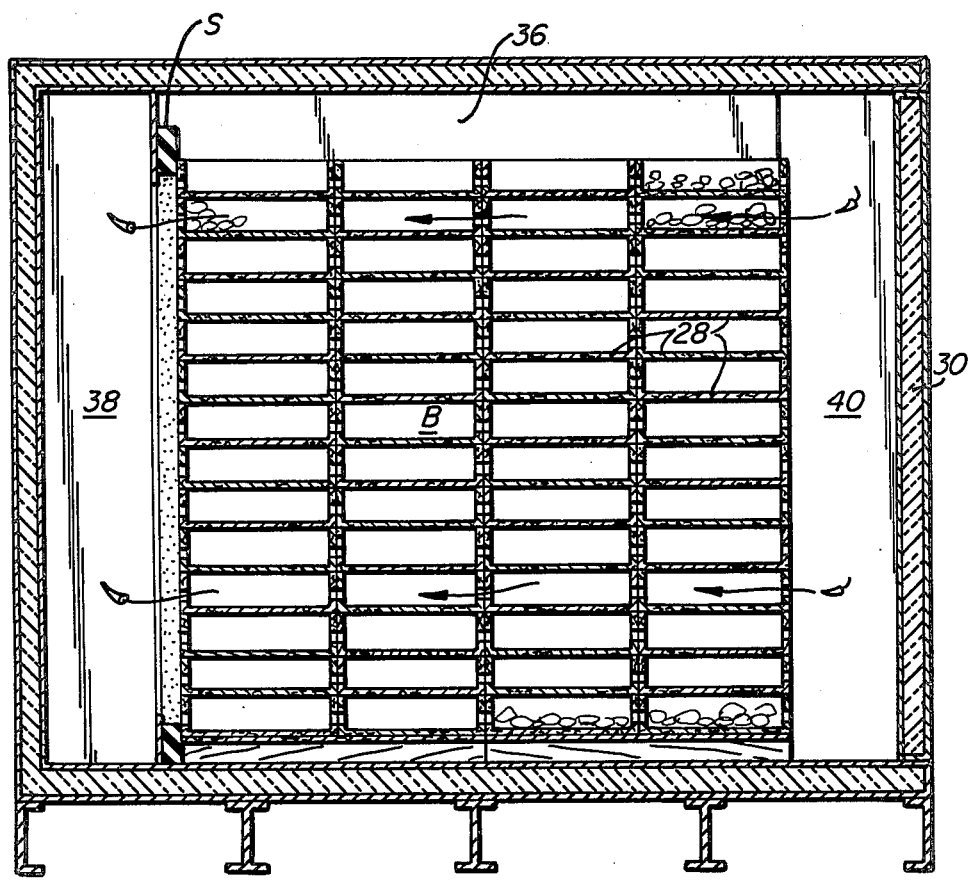
FIG._5.

PRESSURE AIR COOLING CHAMBER FOR UNITIZED VEGETABLE LOADS

This invention relates to refrigeration and specifically to the cooling of freshly picked vegetables from the field. A specialized cooling chamber and related process is disclosed which in cooperation with the load forms a portable and thermally intimate environment for cool-down of a freshly picked vegetable such as cauliflower, melons, strawberrys, grapes, etc.

SUMMARY OF PRIOR ART

Freshly picked and palletized field vegetables are commonly cooled by forcing air through cartons. Accompanying this patent application at FIG. 2, is a prior art representation of a typical palletized load.

While dimension is not important, it will be recited here because of broad standardization.

A typical pallet 14 having cavities for forklift 16 is illustrated having a flat and upper loading surface 18. On top of each pallet there are four discrete stacks of containers all 94 inches overall in height.

It will be seen that the hand holds 20 by which the cartons are typically grasped are registered one to another. Moreover, and referring to the palletized load illustrated being transported on the forklift of FIG. 1A, it will be understood that the handles are aligned to and within the direction of motion of the forklift. That is to say the registered hand holds between adjacent cartons define and assist a desired air flow path of cooling air through the containers.

In the particular embodiment herein illustrated, intermittent sheets 22 cover the entire palletized load between the seventh and eighth carton and at the top of the palletized load. Columnar stability between the four separate columns of cartons is achieved.

In the prior art, such palletized loads have been drawn down to cold storage temperature in a very large and enclosed room. This drawing down prevents spoilage and release of field heat of the vegetables in the cold storage facility over a long period of time.

The technique by which such forced draw-down to storage temperature occurs is to define along ends or sides of the large storage facility a plenum for the low pressure return of vegetable heated cooling air to refrigeration apparatus. Typically, this plenum has communicated to it a large aperture not at all unlike an open doorway. Two rows of cartons are abutted to the plenum wall and stand on either side of the doorway. These two rows extend a predetermined distance into the enlarged cooling area. The rows of cartons are covered with an air impermeable dropcloth such as neoprene plastic so as to define a air suction barrier. When refrigeration equipment is activated, the low pressure within the plenum draws cool air from the large cold storage facility in a high resistance and circuitous flow path over the vegetable in the cartons and on the pallets. Rapid cooling of the vegetable occurs. Similarly heating of air to effect the vegetable cooling also occurs.

This heated and discharged air is drawn in the tunnel formed between the rows of palletized vegetables under the cloth. The air when drawn down through the tunnel discharges into the plenum to be cooled by refrigeration apparatus. Drawing of the air under the dropcloth occurs at a pressure of 1 to 2 inches of water, this pressure not being inconsiderable considering the large areas utilized (on the order of 8 feet high, 10 to 12 feet wide and 16 feet in length).

The prior art is not without its disadvantages. First, and in the cooling process of the prior art, a large enclosed cold-storaged facility must be utilized not only for the bulk storage of the vegetables but for the individual handling of the pallets to form the described tunnel and rapid cooling configuration. Moreover, the cold-storage facility must be formed with an integral air-cooling plenum and the vegetables to be cooled must be conformed to and stacked against the permanent building plenum to effect cooling. Most importantly, capital cost is high.

In the permanent building prior art, a large volume of cold air is required to be maintained in the building at relatively high energy costs. Additionally discharge of the warm air utilized in vegetable drawdown to storage temperature occurs within the facility.

SUMMARY OF THE INVENTION

A cooling chamber for drawing down freshly picked and field warmed unitized (for example in cartons stacked on pallets) vegetables, such as cauliflower, is disclosed. Freshly picked cauliflower is placed in rectangular cartons in side-by-side stacks of four extending approximately fourteen cartons high. A group of individual pallets (typically 10 to 12) so loaded are typically placed in the field on a transport chassis and brought to the vicinity of the cooling chamber where they are simultaneously unloaded by a multi-pallet forklift truck. The chamber receives multi-pallet load through an open door and is inserted into the chamber. This chamber has a rear seal which conforms to the periphery of the load and defines in the interstitial volume between the chamber backwall and load a warm air return plenum to forced draft refrigeration apparatus. The load when placed within the chamber has a door closed to form an air-tight seal. At the same time, this door forms an interstitial volume between the load and door for a high pressure cool air plenum from the forced draft refrigeration apparatus. Circulation of forced and cooled air occurs for rapid draw-down of the palletized vegetable load to a curing temperature. Thereafter, and upon cooling of the load, opening of the door followed by removal of the load occurs. There results an apparatus and process for rapid vegetable cool-down in an isolated and portable chamber.

OBJECTS, FEATURES AND ADVANTAGES

An object of this invention is to disclose apparatus for effecting a rapid draw-down of carton placed vegetables in palletized loads. According to this aspect of the invention, a chamber is provided with forced draft refrigeration apparatus extending across an air flow path having a low pressure and warm air inlet and a high pressure and cold air outlet. The chamber has a seal at the periphery only of what would otherwise be a free flow path. The palletized cargo on a multi-pallet forklift (for example 6 pallets long, 2 pallets wide for a total of 12 pallets) is placed within the chamber and registered to the seal. Door closure defines in front of the load a high pressure cold air plenum. Load bulk and placement to the seal defines behind the load a low pressure return to the refrigeration apparatus. Rapid cool-down of the field warm produce, such as cauliflower, occurs in the intimate environment of the disclosed portable chamber.

An advantage of this apparatus is that the cooling chamber is conformed to the produce load. Consequently, only two handling steps need occur from a field trailer to warehouse mass storage. These steps are unloading from a field trailer and placement to the disclosed portable storage cooler and removal of the cooled load and placement to bulk storage or transport facility.

Another object of this invention is to disclose a process of cold storage draw-down of freshly picked and field warm produce. According to the disclosed process, a chamber having a cooling fluid circuit defined between a first side and a second side is disclosed. The step of opening of one the sides and providing between the sides a seal is set forth. Palletized carton contained cargo is registered to the seal so as to define a high resistance circuitous flow path in the carton over and through the vegetables to be cooled. Air flow occurs between the high pressure plenum on one chamber side and a low pressure plenum on the other chamber side as defined across the seal and load. Resultant heat exchange causes rapid vegetable cool-down.

An advantage of the disclosed apparatus is that the palletized load is made to conform to the desired cooling. Special rearrangement and draping of the load in conformance to a building is not required. Instead, the load itself cooperates in the overall disclosed cooling process within an intimate chamber.

A further advantage of this invention is that handling of separate pallets within an already refrigerated building is not required. Instead, the refrigeration apparatus herein enables rapid cooling in an isolated environment. A minimum of handling in the bulk cold-storage facility occurs.

Other objects, features and advantages of this invention will become more apparent after referring to the following specification and attached drawings in which:

FIG. 1A illustrates the cooling chamber of this invention being loaded by a multi-pallet forklift truck;

FIG. 1B illustrates the required portability of the cooling apparatus of this invention as well as illustrating the temporary highway transport of a field collection vehicle having a palletized load similar to the forklift mounted load of FIG. 1A;

FIG. 2 is the prior art stack of palletized fresh picked cauliflower partially broken away;

FIG. 3 is a plan view of the cooling chamber of FIG. 1A with the door closed, the plan view herein illustrating registration of the multi-pallet load to the disclosed seal of the chamber of this invention;

FIG. 4 is a front elevation section along lines 4—4 of FIG. 3 along the high pressure cool air plenum illustrating in front elevation the registration of the multi-pallet load to the seal to form the flow path barrier of this invention; and FIG. 5 is a side elevation section arbitrarly taken through the load which illustrates the registered hand holds and contained produce forming a high resistance cooling path for the rapid cooling of the carton contained and palletized freshly picked vegetables.

Referring to FIG. 1A, a multi-forklift truck A is illustrating transporting a palletized load B to and towards the cooling chamber C of this invention. Door 30 is shown in the open position and the rectangular spaced load registered to a corresponding and larger rectangular aperture in the chamber C. Insertion and then withdrawal of the cooled load occurs along the same path illustrated in FIG. 1A.

With reference to FIG. 1B, it can be plainly seen that the field transport on a chassis D is in the same configuration as the palletized load B. It can therefore be understood that in a first movement to the cooling chamber C and in a second movement to the bulk storage and/or transportation facility only two movements of an entire palletized load occurs, all on the multi-forklift truck A.

Having previously described the discrete pallets 14, reference will be had to FIGS. 3 and 4 to set forth the invention. Thereafter and with reference to all the figures, operation of the apparatus as well as the disclosed process will be set forth.

Referring to FIGS. 3 and 4, an insulated chamber 30 the approximate size of a standardized cargo container is illustrated. The rectangular chamber has a top, bottom and four sides, all substantially air-tight and insulated. The chamber includes conventional forced draft refrigeration apparatus including a forced draft blower 32 and air cooling apparatus including a forced draft blower 32 and air cooling coils 33. Cooling coils 33 are connected by means of standardized connections (not shown) to refrigeration apparatus.

The refrigeration apparatus can be seen in the vicinity of the chamber end wall 35. A circuitous flow path has blower 32 communicating the lower pressure, warm air intake side at plenum 38 to the high pressure, cool air outlet side at plenum 40.

The palletized stack 28 of FIg. 2 is illustrated in FIG. 3 in plan and FIG. 4 in elevation. As can be seen, six such pallets two deep are illustrated in plan with the pallets individually being 96 inches high.

The chamber has an integral portion thereof defining a protruding seal. This seal is typically mounted at the sidewall of the chamber and at one end to intermediate wall 36 and is generally denominated by the letter S. Preferably, the seal is of a spongy plastic which is conformable to the side edges of the periphery of the load 28. Thus when the forklift causes introduction of the load within the chamber the load registers to and abuts the peripheral seal on the back and rectangular side. Such registration and abutment occurs at the top border, the bottom border and the two side edge borders of the rectangular back section of the load.

The chamber typically is provided with a door. This door illustrated at 30 in FIG. 1A can be of any number of constructions. As shown in FIG. 1A, a vertically sliding sidewall is illustrated. Similarly hinges and appropriate swinging movement of the door could as well be used. For simplicity, detail is omitted in this regard.

Operation is easily understood. Typically, the palletized load B is picked off of the transporting trailer D and placed within the chamber C. In such placement the rear wall of the palletized load B is registered against the seal S to form the desired flow path. When door closure occurs, the refrigeration apparatus is started and air is drawn from the warm air and low pressure return plenum 38 to and towards the cool air and high pressure plenum 40. A flow path across the vegetables occurs. Since the palletized produce has its hand hold registered an irregular and cooling flow path is formed. Rapid draw-down of the vegetable load to storage temperatures occurs.

Upon completion of draw-down door 30 is opened, the pelletized loads removed and placed in either bulk storage and/or suitable transportation facilities.

The reader will realize that it is the cooperation between the palletized load and the cooling chamber which is herein stressed. Consequently, some modification of the disclosed invention may occur without departing from the scope of this invention. For example, the closure of the door could form any part of the airflow path herein.

I have used the term "unitized" to cover generally the manner in which the produce can be handled. The reader will understand that I intend to include handling of the produce by all bulk techniques known such as large boxes, slip sheeting and the like. It is only required that the load register to a seal and have an air path of high resistance for cooling as taught herein.

What is claimed is:

1. A cooling chamber for cooling at least a unitized load of field warm freshly picked vegetables with said unitized load having a generally rectangular volumetric onfiguration with exposed rectangular areas, said cooling chamber comprising:
    an enclosed chamber having a bottom, top and respective four sides for forming a substantially air-tight enclosure for a refrigerating air flow path;
    refrigeration apparatus communicated across a first portion of said chamber, said refrigeration apparatus including a forced draft blower and heat receiving coil between a low pressure return air plenum and a high pressure outlet air plenum;
    one of the walls of said chamber forming a door for opening to receive said unitized load and closing to form said air flow path;
    a seal disposed within said chamber for registration to one of said exposed rectangular areas of said unitized load to cause said load to form a circuitous and pressure differential flow path between said respective plenums whereby forced cooled air flowing through said field warm vegetables draws said vegetables down to storage temperature.

2. The invention of claim 1 and wherein said seal is aligned along a vertically disposed plane relative to said chamber.

3. The invention of claim 1 and wherein said wall of said chamber forming a door defines upon closure between said unitized load and door an air plenum.

4. The invention of claim 1 and wherein at least a portion of the refrigeration apparatus is within said chamber.

5. In combination an enclosed chamber having a bottom, top and respective four sides for forming a substantially air-tight enclosure for a refrigerating flow path;
    a unitized load of freshly picked vegetables with said unitized load have a generally rectilinear volumetric configuration with exposed rectangular areas exterior of said unitized loads;
    said unitized load are placed within said chamber;
    referigeration apparatus communicated across a first portion of said chamber, said refrigerated apparatus including a forced draft blower and heat receiving coil between a low pressure return plenum and a high pressure outlet air plenum;
    one of the walls of said chamber forming a door opening to receive said unitized load and closing to form said air flow path;
    a seal disposed within said chamber for registration to one of said exposed rectangular areas of said unitized load to cause said load to form a circuitous and pressure differential flow path between said respective plenums whereby forced cooled air flowing through said field warm vegetables draw said vegetables down to storage temperature.

6. The invention of claim 2 and wherein said seal comprises a conformable elastic membrane.

7. The invention of claim 2 and wherein one of said plenums is defined between a door of said chamber and a portion of the load.

8. The invention of claim 2 and wherein said refrigeration apparatus communicates high pressure cool air to one of said plenums and low pressure warm air from the other of said plenums.

9. A process for cooling a unitized load of field warm freshly picked vegetables comprising the steps of providing an enclosed chamber having a bottom, top and respective four sides for forming a substantially air-tight enclosure for a refrigerating flow path;
    providing interiorally of said chamber a seal disposed within chamber for registration to one of the exposed rectangular areas of a substantially rectilinear unitized load of carton contained vegetables;
    opening one of the sidewalls of said chamber;
    registering said unitized load to said seals;
    closing said door;
    forcing cooled air from refrigeration apparatus through said unitized load between a low pressure return air plenum and a high pressure cool air plenum to draw-down said vegetables to storage temperature.

* * * * *